No. 897,736.

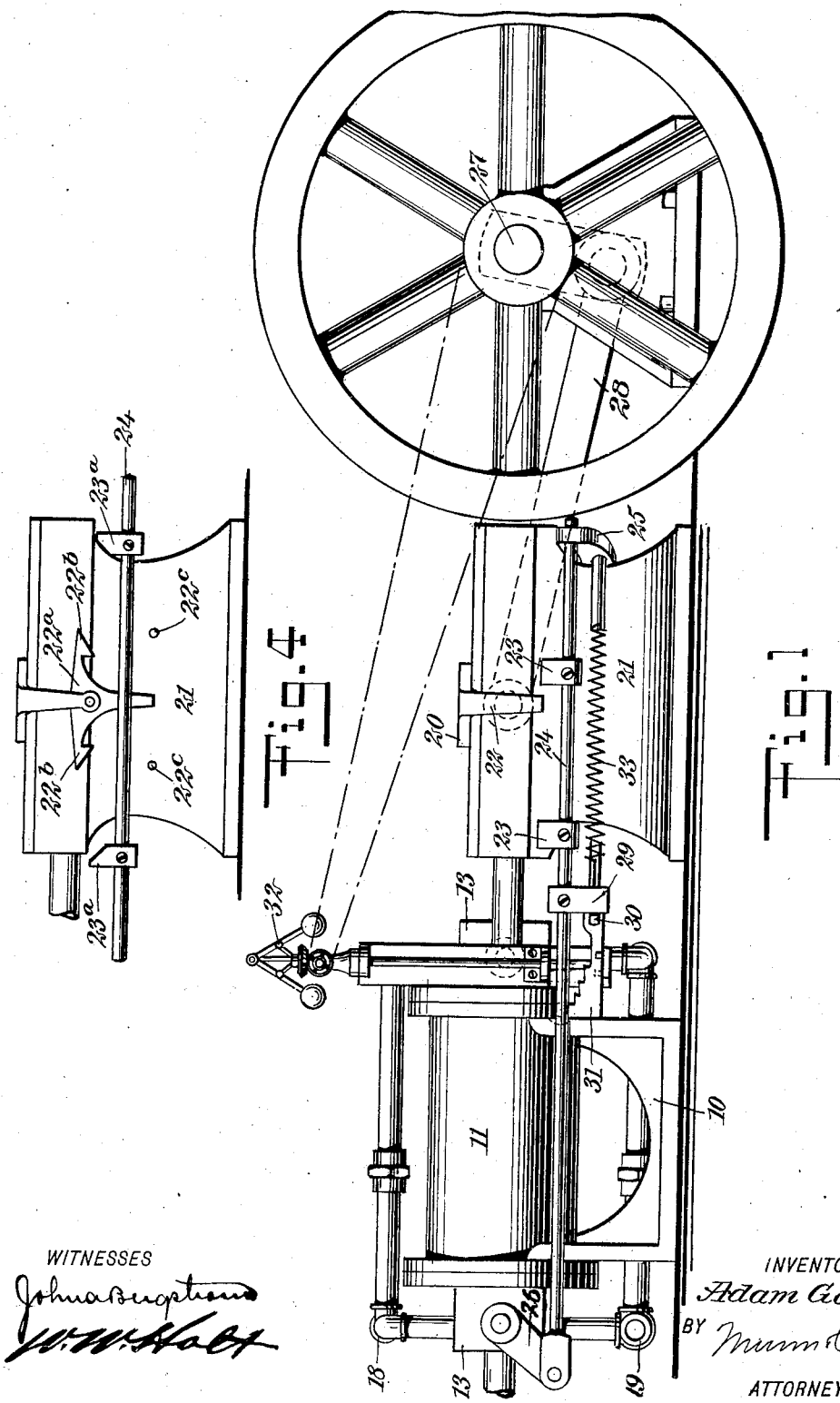

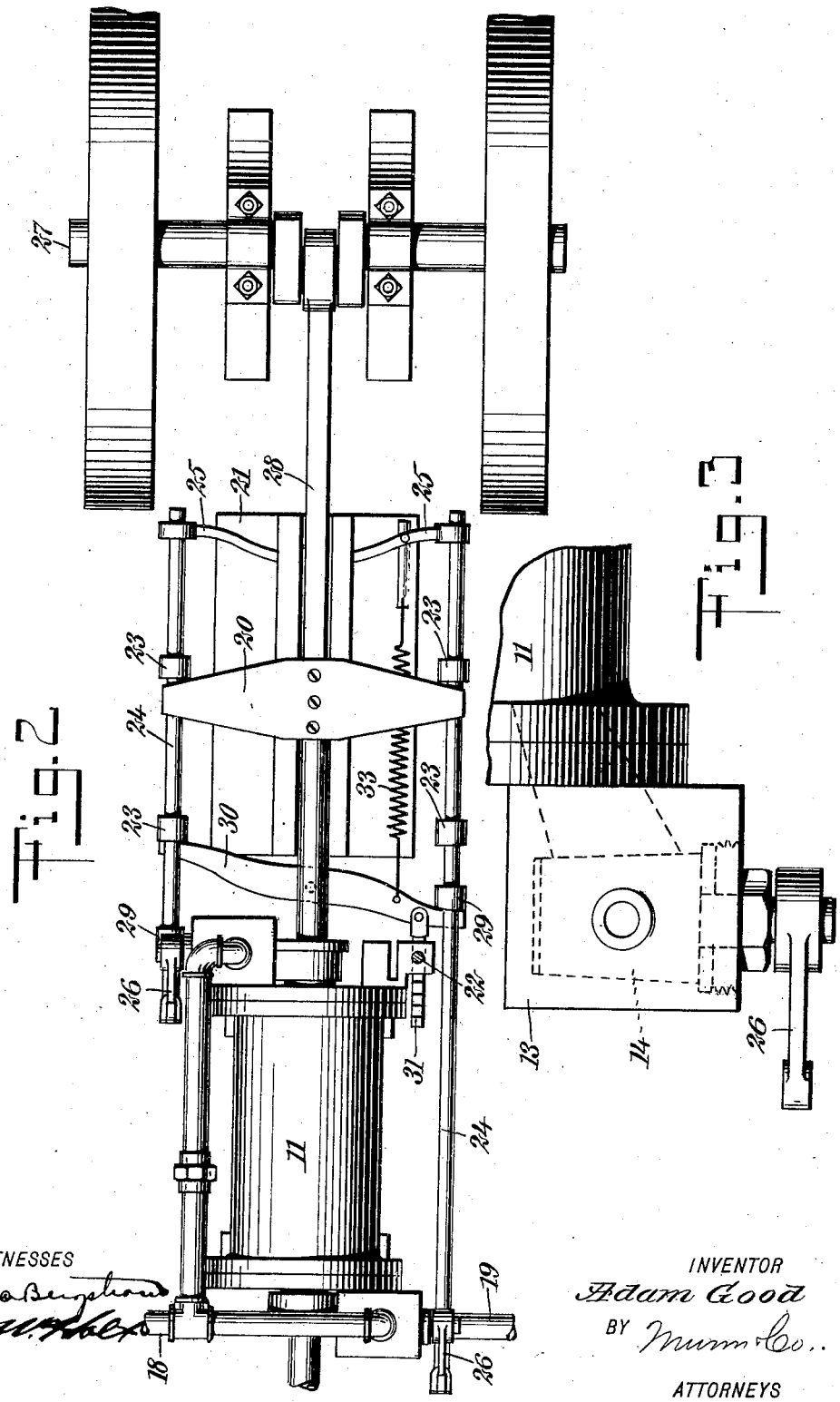

A. GOOD.
VALVE MECHANISM FOR ENGINES.
APPLICATION FILED DEC. 21, 1907.

PATENTED SEPT. 1, 1908.

3 SHEETS—SHEET 3.

WITNESSES

INVENTOR
Adam Good
BY Munn & Co.
ATTORNEYS

UNITED STATES PATENT OFFICE.

ADAM GOOD, OF MANHATTAN, KANSAS.

VALVE MECHANISM FOR ENGINES.

No. 897,736.

Specification of Letters Patent.

Patented Sept. 1, 1908.

Application filed December 21, 1907. Serial No. 407,479.

*To all whom it may concern:*

Be it known that I, ADAM GOOD, a citizen of the United States, and a resident of Manhattan, in the county of Riley and State of Kansas, have invented a new and Improved Valve Mechanism for Engines, of which the following is a full, clear, and exact description.

This invention has reference to improvements in the valve mechanism of reciprocating engines, having in view the provision of novel means for maintaining the speed of the engine substantially uniform.

The invention further resides in certain special features of construction and combination of parts as will be hereinafter particularly described and claimed.

Reference is to be had to the accompanying drawings forming a part of this specification, in which similar characters of reference indicate corresponding parts in all the views.

Figure 5:
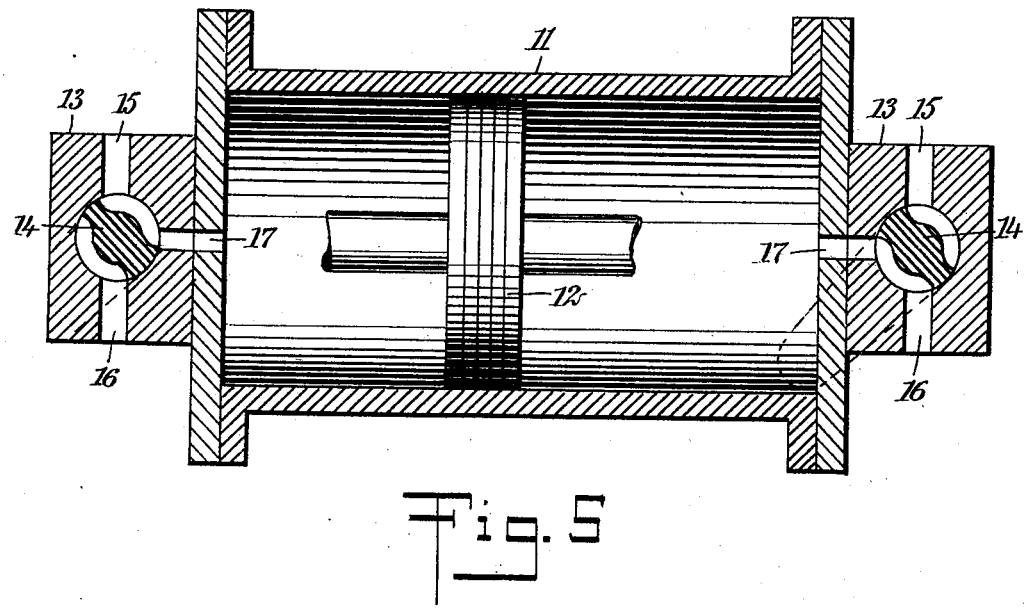
Figure 6:
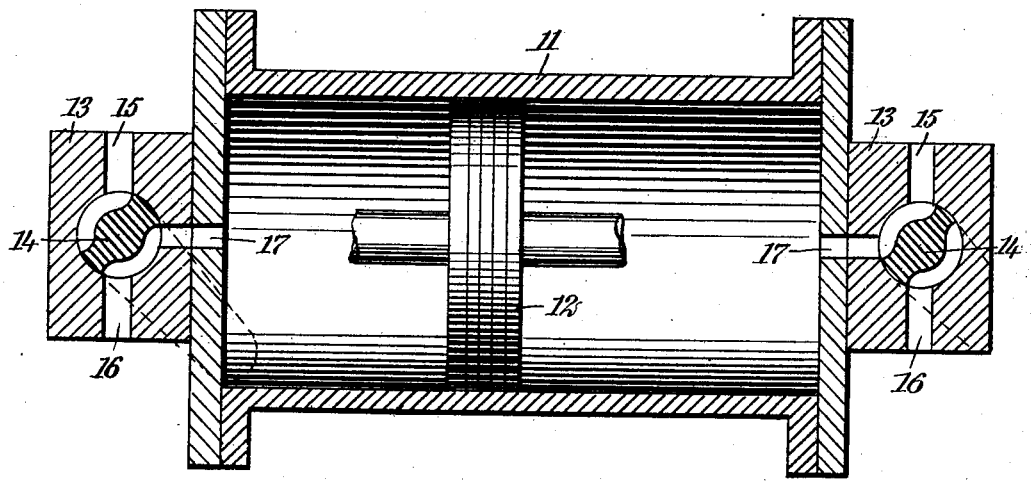

Figure 1 is a side elevation of an engine embodying my invention; Fig. 2 is a plan of the same; Fig. 3 is a fragmentary view on an enlarged scale; Fig. 4 is a side elevation of a modified form of valve-controlling means; Fig. 5 is a longitudinal section through the cylinder and controlling-valve as when the piston is moved in one direction;
and Fig. 6 is a similar section as when the piston is moved in the opposite direction.

The engine as preferably constructed includes any suitable base 10, on which is seated a horizontally-disposed cylinder 11, the latter having a working piston 12 and valve-casings 13, the said casings being rigidly secured to the cylinder-heads at the opposite sides of the longitudinal center, as best shown in Fig. 2. In the casings 13 are revolubly mounted oscillating valves 14, preferably of conical form, as shown in dotted outline in Fig. 3, and cut away at opposite sides to alternately provide communication between admission ports 15 and the cylinder through a port 17, and through said port to exhaust ports 16; the ports 15 of the casings at both ends of the cylinder preferably having connection with a common fluid pressure supply passing through the pipe 18, and the ports 16 of the casings having connection with a common exhaust pipe 19.

Forward of the engine cylinder, the piston rod of the piston has a connection with a cross-head 20, slidable on a guide-support 21, and having oppositely-extending arms provided at their extremities with depending fingers 22 movable in the path of collars or other suitable projections 23, adjustably carried on valve-rods 24, the said rods being slidable at their forward ends through apertured lugs or arms 25 extending from the guide-supports 21, and pivotally connected at their rear ends to arms 26, respectively carried by, and secured to, the valves 14 of the front and rear valve casings. The cross-head 20 is operatively connected to the driving-shaft 27 through the intermediary of a connecting-rod 28, in the usual or other preferred manner.

In addition to the collars or projections 23 carried by the valve-rods, said rods are also provided with collars or projections 29 arranged in the path of the opposite ends of the lever 30, which is fulcrumed at its center to any suitable support. The lever 30, as shown in Figs. 2 and 4, is connected with a stop 31, which is slidably mounted, and has a stepped upper edge on which the lower extremity of the stem or rod of the governor 32 seats, said governor, as shown, being of the ordinary centrifugal type, and driven from the driving-shaft as indicated in Fig. 1. That arm of the lever 30 which connects with the stop is also connected with a tension spring 33, the said spring operating to normally draw the adjacent end of the lever against the collar 29. By this construction it is apparent that as the speed of the engine exceeds a certain limit, the stem of the governor will be lifted above one or more of the shoulders of the stepped stop, permitting the lever to move forward with the stop, under the influence of the spring, and act alternately upon the collars 29, cutting off the actuating fluid during that period in which the depending fingers 22 of the cross-head are traveling from one set of collars 23 to the other.

In Fig. 4 I have shown a modification of the valve-actuating means, which is in all respects like that just described, except that the collars $23^a$, corresponding to the collars 23, are beveled on their inner faces, and are actuated from the cross-head by a pivotally-actuated T-shaped member $22^a$, having the oppositely-directed latch-heads $22^b$; the depending portion of the T-shaped member being movable in the path of pins or projections $22^c$, extending from the guide-support 21. In the operation of this form of my invention, the latch-heads 22 alternately engage the collars $23^a$, and are tripped therefrom by the projections 22°, thus moving the valve-rods at the beginning of each stroke instead of as the stroke terminates, as in that form of the invention illustrated in Figs. 1 and 2.

The engine as shown and described while being my preferred form of construction, may obviously be modified in particulars without departing from the nature of the invention as defined in the claims annexed.

Having thus described my invention, I claim as new and desire to secure by Letters Patent:

1. In a device of the character described, a cylinder having a working piston and provided with valve casings at the opposite ends thereof, valves revolubly mounted in said casings for controlling the admission and exhaust to and from the cylinder at the opposite sides of the piston and having arms secured thereto, a valve-rod slidably mounted at each side of the cylinder and connected with one of said arms, collars carried by the valve-rods, and a cross-head operatively connected to the piston having depending means at both sides movable in the path of the collars and adapted to alternately contact therewith for actuating the valves.

2. In a device of the character described, a cylinder having a working piston and provided with a controlling valve, a valve-rod connected to the valve, means for actuating the valve-rod from the piston, a governor having a stem, a movable stop having a variable seating surface for said stem, and means connected to said stop adapted to shift the valve-rod when the support is released by the stem.

3. In a device of the character described, a cylinder having a working piston, a valve controlling the admission and exhaust to and from the cylinder, a valve-rod for operating the valve, means for actuating the valve-rod from the piston, a governor, a stepped stop for the governor, a lever connected with said stop, a projection carried by the valve-rod, and a tension spring connected with the lever normally forcing it against said projection.

4. In a device of the character described, a cylinder having a working piston, a valve controlling the admission and exhaust to and from the cylinder, a valve-rod for operating the valve, means for actuating the valve-rod from the piston, a stepped stop, means connected with the stepped stop normally tending to force the valve-rod in a direction to cut off the admission to the cylinder, and a governor for locking the stop.

5. In a device of the character described, a cylinder having a working piston, valves for controlling the admission to and exhaust from the cylinder at the opposite sides of the piston, valve-rods for operating the valves, a cross-head operatively connected to the piston having means for actuating the valve-rods, a lever having means tending to alternately act on said rods and cut off the admission to the cylinder, a governor having a stem, and a device connected with the lever on which the stem of the governor seats operating in connection therewith to lock the lever in positions depending on the speed of the engine.

6. In a device of the character described, a cylinder having a working piston, a valve for controlling the admission to and exhaust from the cylinder, a valve-rod for operating the valve, a lever adapted to operate on said rod, a spring normally forcing the lever in a direction to cut off the admission to the cylinder, a device connected to the lever, a governor having a stem adapted to seat on said device and successively lock it in positions against the tension of the spring, depending on the speed of the engine, and means for actuating the valve-rod from the piston adapted to return said lever and device when released by the governor stem to normal position.

In testimony whereof I have signed my name to this specification in the presence of two subscribing witnesses.

ADAM GOOD.

Witnesses:
W. N. SLOCUM,
CARLOS DROWN.